March 17, 1964

A. G. LAUCK ETAL 3,125,429

METHOD AND APPARATUS FOR CONTROLLING MOLDED
SHAPE OF NECK FINISH OF CONTAINERS

Filed Sept. 11, 1958

INVENTORS
ALBERT G. LAUCK
WILLIAM L. SPIX
AMBROSE L. WALTER
BY J. R. Nelson and
W. A. Schaich
ATTORNEYS March 17, 1964

A. G. LAUCK ETAL
METHOD AND APPARATUS FOR CONTROLLING MOLDED
SHAPE OF NECK FINISH OF CONTAINERS 3,125,429

Filed Sept. 11, 1958

INVENTORS
ALBERT G. LAUCK
WILLIAM L. SPIX
AMBROSE L. WALTER
BY J. R. Nelson and
W. A. Schaich
ATTORNEYS

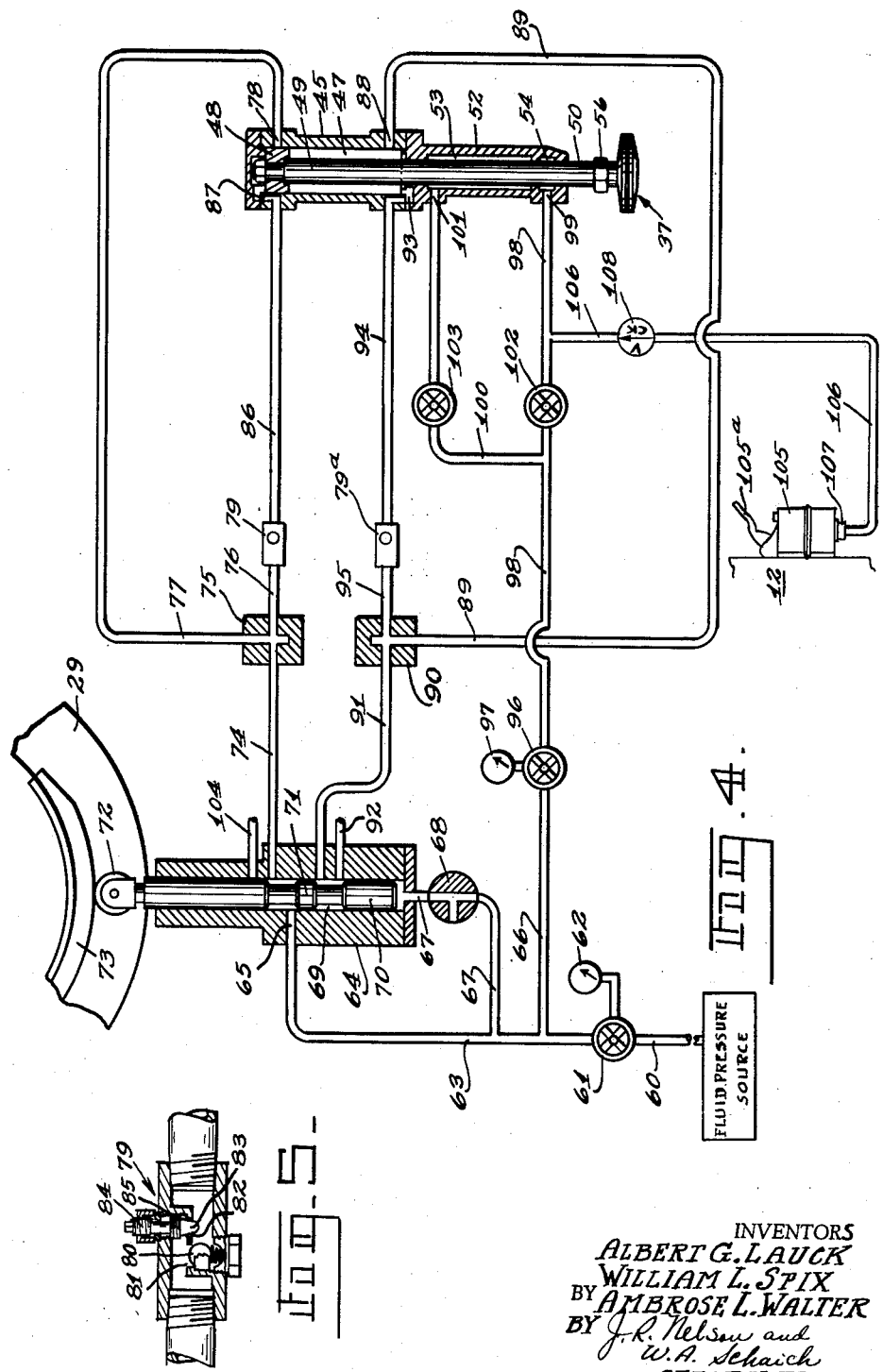

March 17, 1964   A. G. LAUCK ETAL   3,125,429
METHOD AND APPARATUS FOR CONTROLLING MOLDED
SHAPE OF NECK FINISH OF CONTAINERS
Filed Sept. 11, 1958   5 Sheets-Sheet 5

INVENTORS
ALBERT G. LAUCK
WILLIAM L. SPIX
AMBROSE L. WALTER
BY J. R. Nelson and
W. A. Schaich
ATTORNEYS

United States Patent Office 3,125,429
Patented Mar. 17, 1964

3,125,429
METHOD AND APPARATUS FOR CONTROLLING MOLDED SHAPE OF NECK FINISH OF CONTAINERS
Albert G. Lauck and William L. Spix, Toledo, and Ambrose L. Walter, North Kenova, Ohio, assignors to Owens-Illinois Glass Company, a corporation of Ohio
Filed Sept. 11, 1958, Ser. No. 760,523
8 Claims. (Cl. 65—84)

The present invention relates to glass forming machines for manufacture of glass containers, such as bottles, jars and the like, and more particularly to method and apparatus for elimination of out-of-round finishes, which is a distortion defect occurring in the molded neck finsh of containers manufactured by these machines.

The invention also includes in its novel apparatus a means for lubricating the molding surfaces of the neck molds on the machine following a container forming cycle of the mold equipment, as such lubrication may be found to be desirable.

Wide mouth containers are more generally manufactured by the press and blow process, in which the initial step is that of pressing a parison from a gob of glass in a partible blank or parison mold and a partible neck mold, the cavity of the latter defining the exterior contour of the neck finish of the finished container.

Pressing is accomplished by a reciprocating plunger operating through a center opening of the neck mold to press a charge of molten glass against the blank mold and against the glass contacting surfaces of the neck mold. The plunger, when fully inserted in the blank, defines the interior molding surface of the neck finish so as to form the neck opening for the container. The formed parison has a finished neck portion and integral body blank which is conventionally transferred to a blow mold where the body blank is expanded by blowing to the finished shape of container.

Throughout the various transfers during the forming cycle after the parison is pressed, the container is carried continuously in the neck mold. During this time, the glass is progressively cooling, but at the time the neck molds release the formed finish of the container, the glass in the neck finish is still in the process of cooling to set-up the finish or the physical characteristics of the glass of the finish is changing from a deformable viscous plastic state (assimilating warm taffy) to a nondeformable solid.

One of the difficulties prevalent in the forming process is that the neck finish, after its release from the neck mold, will distort and develop an out-of-round configuration. Out-of-round of the neck of the container, if it exceeds the established narrow tolerances, results in off-gauge ware unfit for commercial use. These tolerances are determined by the ability to apply a suitable closure and obtain an acceptable seal at the neck of the container.

This out-of-round defect is attributed to the fact that at the time the neck finish is released from the defining "round" confines of the neck mold cavity, the glass is not as yet set-up sufficiently so that after the mold releases from the glass, due to a differential in cooling rate occurring around the periphery of the neck finish which was propagated in the neck mold, the glass of the neck finish will be permitted to distort out-of-round. This distortion results in the neck finish finally rigidifying in this out-of-round configuration, which, as just mentioned, if it exceeds very close tolerances, results in "off-gauge" finishes and the container must be scrapped. This difference in the cooling rate of the finish about the periphery of the neck mold is traceable to the fact that in the neck mold the glass cools faster at the mold seam or parting line of the neck mold than at any other part of that mold.

In sampling ware found to have this out-of-round defect, it is generally the case that the diameter of the finish across the mold seam is less than the diameter of that finish lying normal or perpendicular to the mold seam. The degree of shrinkage during setting up of the glass after the finish is released from the mold is attributable directly to the rate of cooling of glass. At the mold seam diameter, the neck mold seam tends to vent the air between the pressed glass and the glass molding surface of the neck mold so that the glass and the metal of the mold have a more intimate contact than exists near the diameter normal to the seam. In the region near this latter diameter, an air film exists between the glass and metal, and since the metal of the mold is a better heat conductor than the air film, the result is that the glass is cooled at a higher rate at this mold seam. Consequently, the glass sets up faster and shrinks to a greater extent adjacent the neck mold seam.

It is, therefore, an important object of the present invention to provide method and apparatus for cooling the neck finish of the formed ware in a controlled manner while the finish is still within the confines of the neck mold. Thus, the cooling is applied so as to rigidify the glass or set it up sufficiently in the neck mold to retain the truly rounded shape of the neck mold cavity.

Another object of the present invention is to provide a novel cooler head assembly which may be mounted on a glassware forming machine, and while the neck finish of formed ware is still held in its neck mold, a coolant medium sprayed internally about the neck finish to accelerate the cooling of the glass in the neck and equalize any differential cooling effect of the neck molds. Thus, as the glass sets up while in the neck mold, it is cooled uniformly by controlled cooling.

Another object of the invention resides in the fact that by the aforementioned method and apparatus the neck molds are able to be cooled in an accelerated fashion beyond their normal cooling rate in machine operation. This latter-mentioned cooling occurs simultaneously with cooling the glass in the neck of the ware held by the molds.

A further object of the present invention is the provision of such novel cooling apparatus, as mentioned, that is operable automatically with the ware forming machine cycle, so as to take advantage of a dwell period in the forming cycle as the ware is successively advanced to the take-out station on the machine.

A still further object of the inveniton is to provide a method of controlling the molded shape of the glass in the neck finish of machine molded glassware by accelerating cooling that glass through the application of a coolant internally of the neck after the article of ware is blown and while at least the neck of the article is still in a mold.

The present invention is also adaptable as a means for applying a lubricant to molding surfaces of mold equipment, such as the neck molds. It is common practice in glass forming practice to lubricate these mold surfaces between molding or glass contacting cycles, or to lubricate them periodically as the need may be in order to improve their glass release properties.

Therefore, the present invention also includes as an object the provision of a lubricator device useable in combination with the aforementioned novel apparatus mentioned for cooling the glass in the neck finish. As will be more apparent hereinafter, this novel apparatus includes a connection from a source of mold lubricant to the coolant medium used for cooling the glass. At the proper time, the lubricant is injected with the pressurized coolant so that the latter then serves as a vehicle for applying the lubricant as a spray onto the molding surfaces of the mold. This is performed after the container is released from the neck molds and while the molds are at the take-out station of the machine.

Other objects of the present invention will become apparent from a reading of the following description, the appended claims, and the accompanying drawings which include a practical embodiment of the invention and to which reference is made hereinafter.

On the drawings:

FIG. 2A is an enlarged fragmentary sectional view of the cooler head of the present invention shown in its operating position for cooling the neck finish of a molded glass container.

FIG. 4 is a partially schematic view including a diagram of the fluid circuits for operating the cooler head of the present invention. This figure also illustrates the novel apparatus for lubricating molding surfaces of a neck mold.

FIG. 5 is a detailed sectional view of the two throttle valves in the head end and tail end exhaust lines of the fluid pressure actuated reciprocating motor shown in FIG. 4.

FIG. 6 is a sectional plan view taken along line 6—6 of FIG. 2.

Figure 1:
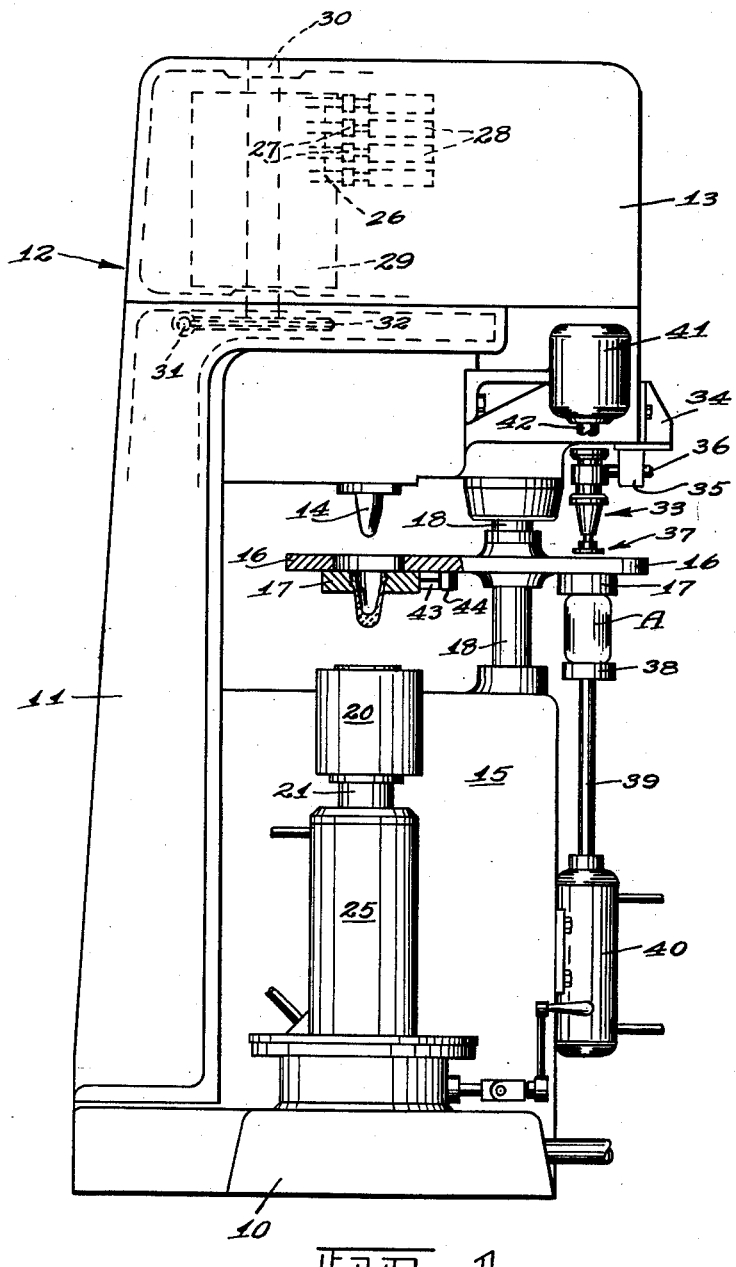
FIG. 1 is a partial elevational view of a glass forming unit of a glass blowing machine which operates on the press and blow process with the inclusion of the present invention.

In FIG. 1 of the drawings, 10 is a base upon which is mounted a column 11 supporting a hydraulic operating mechanism for a pressing plunger 14. These mechanisms are mounted in an enclosing head 12 at the top of column 11 and a removable hood 13 is provided permitting access to these mechanisms. A table 15 supports a rotatable carrier 16 upon which is mounted a series of neck molds 17 arranged to be moved to and from pressing and blowing positions. The carrier 16 is mounted on a vertical shaft 18 which is driven intermittently in step-by-step fashion from a motor drive, not shown.

At one station, the neck molds 17 are maintained in operative position and arranged to cooperate with a press mold 20 mounted on the top end of a vertical piston rod 21. As shown more in detail on FIGS. 2, 2A and 3, the neck molds are carried on a one-piece annular thimble 19 having a ring which fits with a corresponding groove at the upper portion of each half of the neck mold. The neck mold halves are opened and closed by movement away and toward each other and maintained in proper registry by the ring and groove fit with the thimble. Thimble 19 is rigidly connected to the neck bushing 22 which in turn is nested by the integral annular clamp 23 in the bearing 24 at the top of the carriage 16. The press mold 20 (FIG. 1) is moved to and from its operative position with the neck mold 17 by an air motor 25. Directly above the press mold 20 is pressing plunger 14 adapted for vertical movement to and from the operative position in cooperative alignment with the neck molds 17. When the molten glass has been charged to the press mold 20 and the glass parison pressed to shape by the cooperating vertical movements of mold 20 and plunger 14, the glass parison will include an integrally formed neck finish. The mold and plunger are withdrawn to the position shown, whereupon the carrier 16 is adapted to transfer the parison to the blow mold (not shown) where it is enclosed by said mold and a blowing head is seated on the carrier 16 from above to provide blow air to expand the parison to its ultimate shape in the blow mold. The blow head is carried on piston rod 42 (shown broken) and is moved to and from its operative position with the blow mold by the vertically reciprocating actuation of the fluid pressure operated motor 41. The blow mold, although not shown, is at an advanced station of the counterclockwise rotational indexing movement of the carrier 16 and substantially aligned axially in an underlying relationship to the piston rod 42.

The just-described operations of the molding machinery are controlled by timing devices which comprise cams 26 and cooperating cam followers 27. The reciprocating displacement of the cam followers operate the setting of spool-type fluid valves 28. The timing cams 26 are mounted on a cylindrical timing drum 29 and are rotated about a central vertical shaft 30. A constant rotation is provided to shaft 30 through a worm 31 and pinion 32, the latter being keyed onto the shaft 30.

In the illustration of the apparatus on FIG. 1, the heart of the present invention resides in the inclusion of a cooler head assembly, referred to generally at 33, which is mounted on the machine head 12 by an angle bracket 34 having a lower depending radially V-notched trunnion bearing 35. The trunnion bearing receives a horizontal shaft 36 which is frictionally restrained thereon at a normal set position. The friction in the trunnion bearing 35 is applied by tightening cap screw 35a (FIG. 6), which squeezes the bearing 35 tighter onto shaft 36. As will be apparent from the following description, the cooler head 37 of the assembly 33 is reciprocally operated for insertion in and out of the neck finish defined in the neck rings 17 when the latter is advanced by carrier 16 to a ware take-out station on the machine. A dwell in movement of the carrier 16 occurs at the take-out station, as it does at the other stations, so that advantage is taken of this dwell time for operating the cooler head 37 in and out of the neck of the container. At this ware take-out station, a pedestal type bottom plate 38 is mounted on a piston rod 39 for vertically reciprocating movement. The bottom plate 38 is moved to and from its operative position to receive a container A by a fluid actuated motor 40. In operation of the machine, as the carrier 16 advances one of the neck molds 17 from the blow mold (not shown) to the take-out station overlying the bottom plate 38, the container A is held to depend from the neck molds. Inasmuch as there is a dwell at this point in the machine cycle, the cooler head 37 is then lowered into the formed neck finish of the container A and a coolant medium applied onto the glass internally of the neck in a manner as will be presently described in detail. After the glass at the neck finish has been cooled sufficiently to set-up and rigidify, the neck molds are opened by the swinging parting movement of their arms 43 about a pivot 44 at the underside of carriage 16. This releases the container A for sole support on bottom plate 38. Bottom plate 38 is then lowered and take-out apparatus (not shown) removes the container therefrom for subsequent handling.

The just-described trunnion mounting for cooler head assembly 33 provides a safety feature. If, in the advancing rotation of the table 16 after container A is released, the mechanism for effecting withdraw of the cooler head 37 should malfunction, the cooler head assembly 33 will be allowed to pivot on the trunnion shaft 36 frictionally held in bearing 35 so as to prevent breakage or jamming of the unit.

Figure 2:
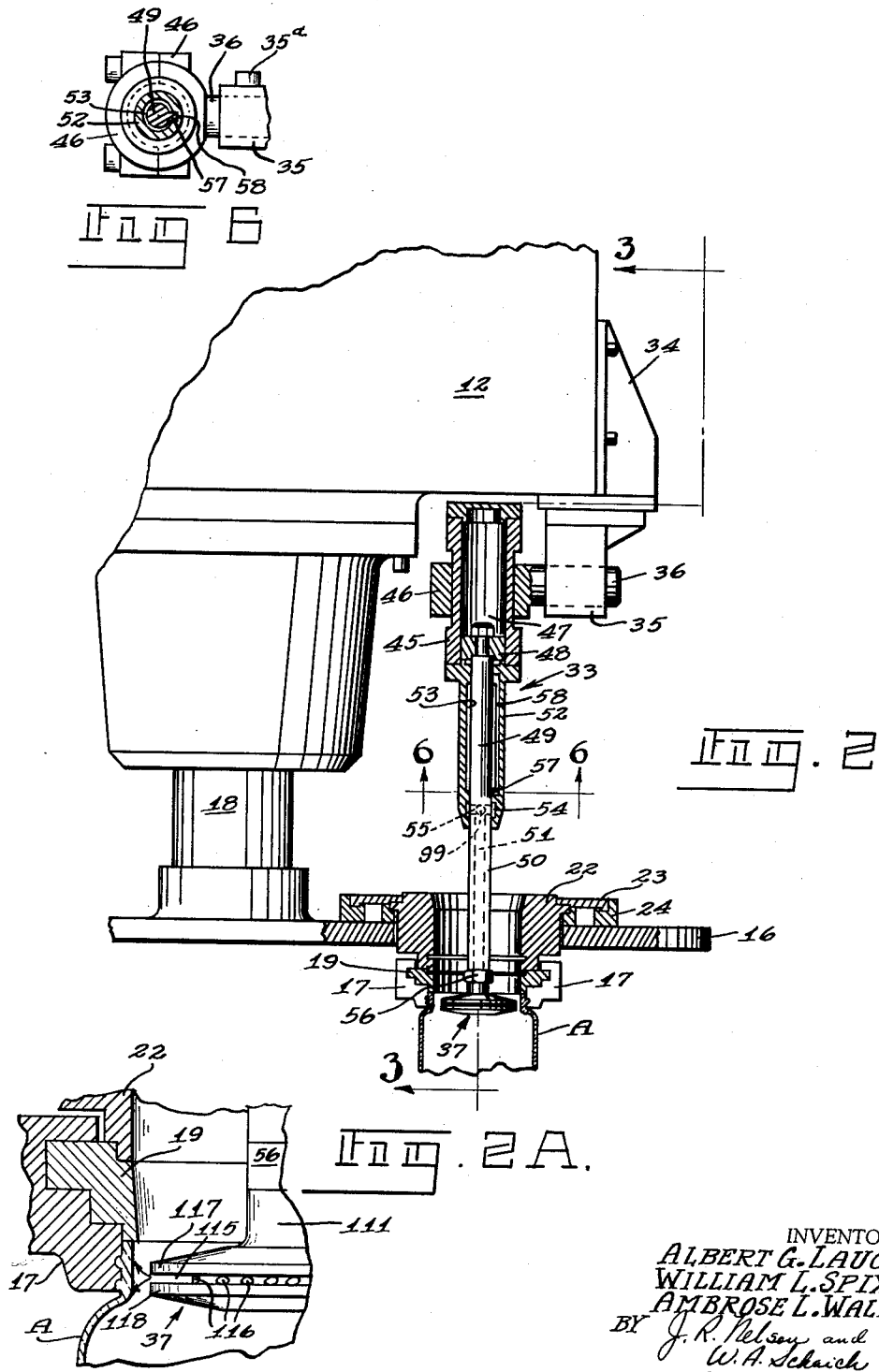
FIG. 2 is an enlarged sectional elevational view showing the novel apparatus of the present invention.

As seen on FIG. 2, the cooler head assembly 33 includes an upper fluid pressure actuated cylinder-piston motor 45 which is held on a bracket 46 integral with the trunnion mounting shaft 36. The motor 45 includes a cylinder 47, a piston 48 and a downwardly dependent piston rod 49. At the lower portion of piston rod 49 is an integral tubular stem 50 defining a passage 51. At the underside of motor 45 is a rigidly connected hollow housing 52 which acts as a guide for piston rod 41 and also includes a fluid-tight chamber 53. In the lower end of housing 52 is another and separate annular chamber 54. Both chambers 53 and 54 have connections to a pressurized coolant source, as will be hereinafter described in connection with FIG. 4. At the upper end of the hollow tubular stem 50 is a radially bored passage 55 which communicates with the passage 51 of the stem. The lower end of the stem 50 has a female threaded coupling 56 to make a fluid-tight connection with the male threaded portion on the cooler head 37. As seen in FIGS. 2 and 6, the vertical stroke of the piston is guided by having a lug 57 integral on the piston rod 49. This lug rides in a milled slot 58 on the inside wall of the housing 52. Thus, during the reciprocating stroke of the piston of the motor 45, the lug 57 and slot 58 prevent rotation of the piston 48 and likewise prevent rotation of the cooler head 37 as it is moved into and out of the neck of the container A.

Referring now to FIG. 4 with occasional reference to FIGS. 2 and 3, the operation of the cooler head assembly will be described.

In the example illustrated in FIG. 4, a fluid pressure source of compressed air is being utilized both as the cooling medium for application through the cooler head and for the pressure fluid to reciprocally actuate the piston 48 of the motor 45. However, the motor may be operated by a source of hydraulic fluid under pressure and the coolant medium be supplied from a pressurized source of air, sulphur dioxide, or atomized liquid. Thus, it is contemplated that, in the present invention, individual pressure sources may be used for the motor and the coolant. In this example, however, compressed air is supplied through a line 60 provided with a regulator valve 61 and a pressure indicator 62. The regulator 61 is utilized, in this example, to receive 45 p.s.i. compressed air in line 60 and adjust its pressure to between 35 and 40 p.s.i. The 45 p.s.i. air is taken from the operating air source used on the forming machine. This air regulated in pressure at 61 is then conducted through conduit 63 which enters a control valve 64 through its inlet port 65. A first T-connection is provided into conduit 63 for a coolant line 66. A second T-connection is made into line 63 by an air line 67. Air line 67 is provided with a 3-way valve 68 which may be utilized to divert the air in line 67. This line 67 then is connected into one end of a valve chamber 69 of the valve 64. Valve chamber 69 is provided with a reciprocable valve spool 70 having a central land 71. The air pressure flowing through line 67 when the valve 68 is set as shown, operates against the lower end of the valve spool 70 to force it axially upwardly, as viewed on FIG. 4. At the outer end of valve spool 70 is a cam follower 72 which is held onto cam 73 by said air pressure in line 67. A rise in the cam is provided at the proper position of its rotation to shift the valve spool downwardly to the setting shown in FIG. 4 against the pressure of the air maintained in the valve chamber through line 67. The cam 73 is mounted for constant speed rotation on the timing drum 29 (see also FIG. 1). This timing drum 29 controls the sequence of operation of the glass forming machine mechanisms. As shown on FIG. 4, when the cam follower 72 hits the high spot in cam 73, valve spool 70 is shifted to connect the pressurized air at inlet port 65 with an outlet line 74.

This line 74 is connected into a 3-way manifold block 75 having outgoing air lines 76 and 77. Line 77 is connected into a cylinder port 78 near one end of the cylinder 47 of motor 45. Air line 76 is connected into a throttling valve 79, which valve permits free flow of air in the direction from the manifold block 75 to the cylinder 47, but throttles or meters the return flow of fluid from cylinder 47 to the manifold 75.

As seen in FIG. 5, the throttling valve 79 achieves this mentioned metering function by having a spring loaded ball check 80 normally set to close passage 81 through the body of the valve. Thus, pressure flow of fluid from left to right in FIG. 5 will depress the ball 80 against its spring and open passage 81 for flow of fluid. However, return flow of fluid from right to left in FIG. 5 will be checked by the ball setting in passage 81. The fluid is then metered through passage 82 which is restricted by an adjustable needle 83. This needle 83 is carried on a threaded stem 84 which is adjustable on the matching threads 85 in the body of the throttle valve 79.

At the other side of the valve 79, as seen again in FIG. 4, a line 86 is connected into a head end port 87 on the cylinder 47 of the motor. Thus, with the control valve 64 set as shown and the piston 48 of the motor at its extreme head end position, air passage in line 77 is blocked by the piston 48 and the air is thus required to go through lines 76, valve 79, and line 86 and enter the cylinder at its head end port 87. This will initiate piston movement downwardly in FIG. 4 until the piston opens the cylinder port 78. After port 78 is opened, the pressure fluid, taking the path of least resistance, will flow through line 77 and drive the piston downwardly. As the piston advances downwardly, air in the lower portion of cylinder 47 is exhausted through a lower cylinder port 88 into a line 89 which is connected to a 3-way manifold block block 90. A line 91 is connected between the manifold 90 and valve chamber 69 of the control valve. At this setting of the valve spool 70, this portion of the valve chamber 69 is in communication with an exhaust line 92. When the piston has reached an advanced stage in its downward stroke so that it covers the lower cylinder port 88, exhaust of the remainder of the air is then made through the tail end cylinder port 93. This port 93 is connected to a throttle valve 79a by line 94. The other side of throttle valve 79a is connected into manifold block 90 by line 95. As described above in connection with FIG. 5, the air exhausted through cylinder port 93 must be metered through the valve 79a in its flow from right to left on FIG. 4. Thus, a fluid cushion is provided in this motor at the bottom of the stroke of the piston 48 so that the motor 45 gradually inserts the cooler head 37 (FIG. 2) within the neck finish of the container A held by the neck molds 17. Still referring to FIG. 4, the T-connected conduit 66 receives 35–40 p.s.i. air and transmits it to a second pressure regulator valve 96, which includes a pressure regulator gauge 97. Here the air pressure is regulated in this described example to about 25–30 p.s.i. This regulated air is fed into a conduit 98 which is connected into a port 99 communicating with the lower annular chamber 54 of housing 52. A conduit 100 is T-connected into conduit 98 and extends to an upper port 101 which communicates with the upper chamber 53 of housing 52. Gate valves 102 and 103 are provided in the conduits 98 and 100, respectively. These valves permit shutting off the air to either or both of the annular chambers 53 and 54.

Figure 3:
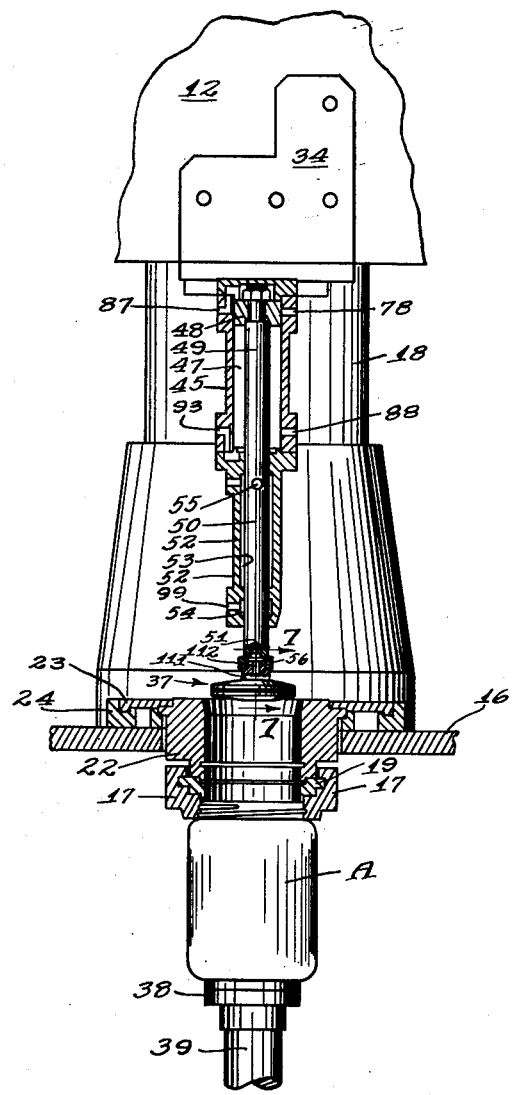
FIG. 3 is an end sectional elevation view taken along line 3—3 of FIG. 2.

Thus, with both valves 102 and 103 open, pressurized cooling air is supplied to the hollow stem 51 through the radial bore 55 communicating with chamber 53 when the cooler head 37 is in its upper position (see FIG. 3). This permits applying cooling air to the neck bushing 22 as the cooler head 37 is moved in and out of the neck mold. As the piston 48 is moved to the lower position to shift the cooler head into the neck finish of the container, the radial bore 55 reestablishes a connection for the cooling air but through the lower annular chamber 54 (see FIG. 2). With the just-described valve settings, the apparatus is set so that air is blown through the cooler head continuously. However, by closing valve 103, the cooling air will only be furnished to the cooler head 37 when the radial bore 55 communicates with the lower annular chamber 54, as shown in FIG. 2, in which case the cooler head will be at its lower-most or extended position within the neck finish of the container.

Having just described the valve setting for extending the cooler head 37, after the cam follower 72 passes to a depressed or lower portion of cam 73, the valve spool 70 will be shifted in the upwardly direction on FIG. 4. This will connect the pressure fluid from the inlet at port 65 of the valve to the portion of the valve chamber lying below the middle land 71 of the valve spool so that pressure fluid will be conducted into manifold 90 through line 91. With the piston 48 at its lowermost position in cylinder 47, the cylinder port 88 will be blocked and the pressure fluid will be conducted through line 95, throttle valve 79a and line 94 into the tail end cylinder port 93. This will advance the piston upwardly until cylinder port 88 is uncovered, whereupon pressure fluid flow will be shifted to the circuit through line 89 and into cylinder port 88, that then being the path of least resistance. At the same time, fluid is exhausted through upper cylinder port 78, line 77, manifold 75, line 74, and with the valve spool 70 in its upwardly extended position, the fluid will be exhausted out of the valve through exhaust line 104. As the piston 48 progresses near the upper end of its stroke, it will block cylinder port 78, whereupon fluid will be exhausted through the head end port 87, line 86, and be metered through the throttle valve 79 to line 76 and manifold 75. This will provide a fluid cushion for the piston at the head end of its stroke for retracting the cooler head 37.

In conjunction with FIG. 4, an additional feature is provided in the invention by the following apparatus. A lubricant dispenser 105 may be mounted conveniently on the column 12 of the machine. The lubricant dispenser 105 is adapted to contain a mold lubricant and is a device, as represented on the drawings, which is generally known as a manually operated lubricator often utilized for manually operated application of lubricating oils to bearings and other moving machine parts. In the present invention, however, this lubricant dispenser 105 has a line connection 106 at its outlet 107, this line 106 being T-connected into the line 98 carrying pressurized cooling air. The line 106 is provided with a one-way ball check valve 108 which permits flow in the line 106 only in the one direction indicated by the arrow on FIG. 4. This lubricator device may be operated by an operator whenever a need may arise for lubricating the neck mold during machine operation. It will be effective, however, for lubricating the neck mold only when the cooler head 37 is in its lowermost position or extended position and when the cavity of the neck mold is exposed after the neck mold has opened to release and be free of a container neck finish. When the operator chooses to inject a charge of mold lubricant into line 106, he depresses the plunger-operating handle 105a of dispenser 105 and a quantity of the lubricant, preferably in the form of a liquid, is injected through line 106, past check valve 108 and into the line 98 carrying the 25–30 p.s.i. air. When the lubricant is injected into the pressurized air in line 98, it is mixed with the air and carried into the lower annular chamber 54, then through radial bore 55, and then is atomized or sprayed through the openings of the cooler head 37.

Figure 7:
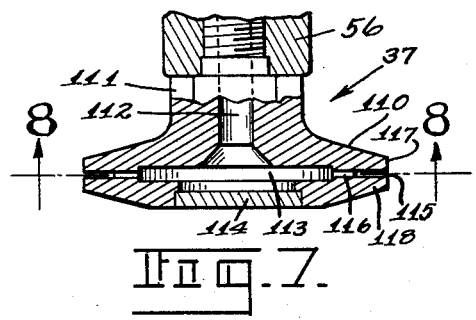
FIG. 7 is a partial sectional elevational view of one form of cooler head apparatus of the invention and is taken along line 7—7 of FIG. 3.
Figure 8:
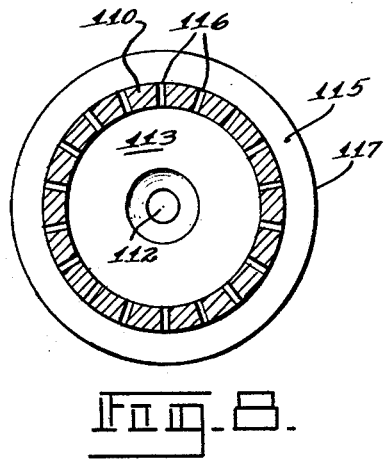
FIG. 8 is a sectional plan view taken along line 8—8 of FIG. 7.

Referring now to FIGS. 7 and 8, one form of the cooler head 37 will be described. This form of cooler head is adapted primarily for use with cooling neck finishes on wide mouth jars. As in all forms of the cooler head, it comprises a cylindrical member 110. Member 110 has an integrally attached shank 111 which is threaded into the corresponding threads internally of the coupling 56. A bored central passage 112 is provided through the shank 111 to register with the passage 51 in the stem 50 (FIGS. 2 and 3). Internally of the cylindrical member 110 is a chamber 113 communicating with the passage 112 and closed at the bottom by a rigidly connected bottom disk 114 integral with the cylindrical member 110. An annular slot or groove 115 is milled out of the periphery of the cylindrical member 110. A series of equally spaced holes 116 are drilled in the member 110 and aligned to open in slot 115 so that chamber 113 communicates with slot 115. The combination of the holes 116, the overlying annular baffle surface 117 and the underlying annular baffle surface 118 combine to provide a nozzle means for spraying a radially directed band of coolant supplied into the chamber 113. Referring briefly to FIG. 2A, this nozzle means, just described, is shown in its operative position for impinging a radially directed annular band of coolant against the interior surface of the neck finish of the blown container A while the neck finish is held in the partible neck mold 17. As shown, this annular band of coolant is directed to extend through a vertically defined area at the interior surface of the neck so as to impinge the coolant primarily at the thickest portions of the neck finish coincident with the formed threads thereof. The span of this vertically defined area can depend on the spacing between the periphery of cylindrical member 110 and the interior surface of the neck finish, the depth of the slot 115 and the diameter of the holes 116. The intensity of the coolant in the annularly applied band is controllable at pressure regulator 96 and/or valve 102.

It should be obvious that, when the apparatus is utilized for spraying a lubricant, the lubricant mixed with the pressurized coolant or air will be sprayed by the aforementioned nozzle means in a similar manner so that the lubricant will be sprayed onto the neck rings while the nozzle means is in the position shown in FIG. 2A, but after the container A has been released by opening the partible neck molds 17.

Figure 9:
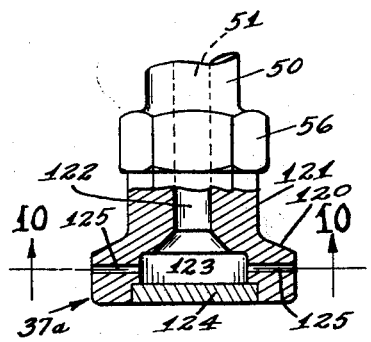
FIG. 9 is a partial sectional elevational view of a second form of cooler head apparatus of the invention.
Figure 10:
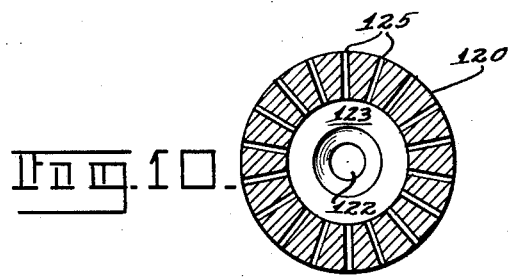
FIG. 10 is sectional plan view taken along line 10—10 of FIG. 9.
Figure 11:
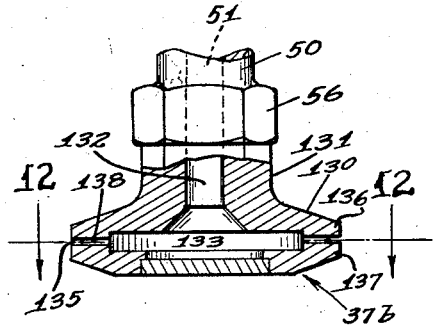
FIG. 11 is a partial sectional elevational view of a third form of cooler head apparatus of the invention.

Referring now to FIGS. 9 and 10, a second form of cooler head is shown. The three forms of cooler heads represented by FIGS. 7, 9 and 11 are examples of the type useable in different size containers, i.e. larger wide mouth containers, medium size wide mouth containers, such as baby food jars, and smaller mouthed or narrow neck containers, such as beverage bottles. The form of cooler head shown in FIG. 9 as 37a is adapted primarily for use on the smaller neck finishes such as found on small mouthed jars or narrow neck bottles. In its construction, the cooler head 37a comprises a cylindrical member 120 having an upper shank portion 121 and threads thereon for connection onto the corresponding threads of coupling 56 at the lower end of the stem 50. A hollow central passage 122 is bored in the shank 121 and registers with the central passage 51 in the stem 50 when the cooler head 37a is assembled onto the stem 50. A chamber 123 is provided internally of the cylindrical member 120. The lower end of the chamber 123 is plugged or closed by a disk plug 124 rigidly connected in the bottom surface of the cylindrical member 120. A series of equally spaced apart holes 125 are bored radially through the walls of the cylindrical member 120 so as to form a nozzle means communicating with the chamber 123. Thus, the cooler head 37a, when lowered into the neck finish of a container, will spray an annular band of coolant from the coolant supplied under pressure to the chamber 123. The arrangement of the drilled holes 125 will impinge the coolant onto the interior surface of the neck throughout a vertically defined area of that surface.

Figure 12:
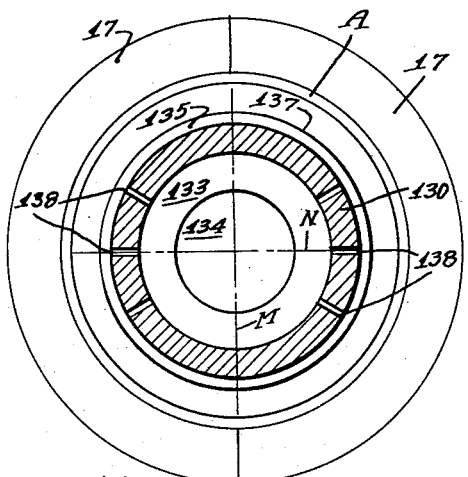
FIG. 12 is a sectional plan view taken along line 12—12 of FIG. 11, and illustrates this form of cooler head in operating position inserted in the neck opening of a molded container that is held by its closed neck mold.

A third form of cooler head 37b is shown on FIGS. 11 and 12. In this form of the cooler head, it comprises a cylindrical member 130 and attached shank 131 having a bored central passage 132. The shank is connected by threads onto the coupling 56 at the lower end of stem 50. The passage 132 registers with the central passage 51 of the stem 50. The cylindrical member 130 is constructed so as to define a chamber 133 which is plugged by an integral plug 134 on the lower end cylindrical member 130. A slot 135 is milled out about the periphery of member 130 so as to define an overlying baffle surface 136 and an underlying baffle surface 137. As shown on FIG. 12, holes 138 are drilled through the wall of member 130 connecting the slot 135 with the chamber 133. The holes 138 are equally spaced on either side of a diameter N of the cooler head. However, the region in which these holes are located spans about 90° on opposite sides of the cylindrical member 130. When the cooler head 37b is mounted onto the stem 50 under this form of the invention, this diameter N should lie normal to or perpendicular to the mold seam diameter indicated at M. Thus, when the coolant is being applied through these bored holes 138 located in such fashion, the nozzle means will apply the annular band of coolant onto the interior surface of the neck of the container so that the greatest intensity of coolant emission will be in a region of said annular band that is centered 90° off of the parting line of the neck molds or the neck seam. By this arrangement, the differential cooling normally occurring at the mold seam, mentioned previously herein, will be compensated for. It is believed that this compensation is most beneficial on comparatively heavy or thick section neck finishes.

In the construction of the various forms of cooler heads described above, it is important to make the outside diameter of the cylindrical members of these heads of a size that will allow a spaced relationship between the interior of the surface of the neck finish and the cylindrical member. The cylindrical member of the head obviously cannot be allowed contact with the glass because such would damage the neck finish and prevent coolant emission at the place of contact.

Although the term "cylindrical member" is used herein to describe the exterior contour of the cooler heads, it is contemplated within this invention that such member could be made to any contour, such as a square, etc., so that its contour generally conforms to the interior configuration of the neck finish. However, the opening in the necks of containers are generally circular.

Having illustrated three specific examples of cooler heads and a practical example of novel apparatus for effectively performing the method of the present invention, it will, of course, be understood that various details of construction may be modified through a wide range without departing from the principles of this invention. In this respect, it is contemplated that the invention may be practiced with various well-known bottle blowing methods such as the Owens suction method, the press and blow method, such as is described and illustrated herein in detail, or the blow and blow method, such as is practiced in the well-known Lynch forming machines. Accordingly, it is not intended to limit the patent granted hereon in any manner other than is necessitated by the scope of the appended claims.

We claim:
1. Glass container forming apparatus comprising means for blow molding a container at a blow mold station, a partible neck mold for supporting said container at said blow mold station, a take-out station remote from said blow mold station, means for mounting said partible neck mold for opening and closing movement, said neck mold being closed about the neck of the container and forming the sole support for suspending the container during subsequent transfer thereof from the blow mold station to the take-out station, neck cooling means including a cooler head assembly, a fluid coolant supply means connected to supply a fluid coolant under pressure to said assembly, means for mounting said cooler head assembly at said take-out station aligned for movement into and out of the container neck opening while the neck is confined and supported by said neck mold at said take-out station, said cooler head assembly comprising a hollow stem, means for connecting said stem to said coolant supply means, a substantially cylindrical member connected at the outer end of said stem and insertable within said neck opening at an operating position whereat it is disposed within the axial extent of the neck mold and in close proximity to the interior surface of a neck finish held thereby, said member including an internal chamber communicating with said hollow stem, and a plurality of radially directed ports in said cylindrical member connected to said internal chamber and opening peripherally on said member to direct coolant received from said internal chamber radially outwardly of said member against a vertically defined area about said interior surface of the neck finish when said member is in its said operating position, and driving means connected to said cooler head assembly for moving its cylindrical member axially into said operating position within the neck mold, said neck mold being subsequently openable to release the container at said take-out station.

2. The apparatus defined in claim 1, wherein said cylindrical member is provided with an annular slot, said slot extending through said plurality of port openings to form overlying and underlying annular baffles on said cylindrical member which extend outwardly from the outer end opening of each of said ports, said baffles providing an annular radially directed nozzle for applying a defined annular band of coolant by said cooler head.

3. Apparatus defined in claim 2, wherein the plurality of port openings are concentrated about a diameter of the head, said diameter, when the cooler head is moved into the neck opening of a container, coinciding with a plane through the neck finish that is located transversely of the parting line of the neck mold.

4. Apparatus defined in claim 1, wherein the plurality of ports are equally spaced apart circumferentially in the cylindrical member of the cooler head and the outer end openings of said ports lie in the same radial plane of the head.

5. Apparatus defined in claim 1, wherein the driving means comprises a fluid operated cylinder-piston assembly connected to the hollow stem of said cooler head, a source of pressure fluid, a control valve, fluid conduits connecting the control valve to said source, opposite ends of the cylinder of said assembly, and exhaust, the control valve being adapted to shift alternatively (1) to connect one end of the cylinder to said source and the other end to exhaust to actuate the piston of said assembly in the direction for moving the cooler head to its extended position within the neck mold, and (2) to connect said other end of the cylinder to said source and the said one end to exhaust to actuate the piston of said assembly in the direction for moving the cooler head to its retracted position out of the neck mold, means normally holding the control valve set for actuating the piston to retract the cooler head, a cam, means for moving said cam by the machine in response to moving the neck mold toward the take-out station, and cam operated means operable for shifting the control valve to its other setting for extending the cooler head, said last-mentioned means being operated responsive to a container held in its neck mold being brought to the take-out station, whereupon the cooler head is extended into the neck of the container.

6. In a glassware forming machine, a turret rotatably mounted, a plurality of partible neck molds continuously carried by said turret, means for intermittently rotating said turret to bring each of said neck molds successively to a plurality of stations, a blow mold at a final molding station and coacting with said neck molds while at said final molding station, means at said final molding station to finish blow a parison in said blow mold, said neck molds thereafter moving to successively suspend the blown ware over a take-out device at a take-out station remote from said molding station, the improvement in said machine comprising neck cooling means including a radially directed, annular neck cooling nozzle device mounted over the turret at said take-out station and operable for movement to an operating position within the axial extent of the neck mold and inside of the neck finish of the blown ware while supported only by the neck molds at said take-out station, said cooling nozzle device being adapted in its axial operating position to direct a coolant radially substantially in a plane normal to the axis of the neck, each of said neck molds being carried first to said final blowing station and subsequently to said take-out station, said neck molds supporting the glassware in cooperative relation with said neck cooling device at said take-out station and thereafter being opened at said take-out station to release the finished glassware.

7. The apparatus defined in claim 6, wherein the nozzle device comprises a plurality of radial fluid passages in a circular arrangement to provide a spray of coolant fluid varying in intensity around the annular application of coolant being emitted by the nozzle, the intensity of coolant emission that is impinged against the interior surface of the neck finish being greater in a region of said annular application that is intermediate the mold seams which occur at the parting line of the partible neck mold.

8. A method for controlling out-of-round distortion of the neck finish of machine molded glassware wherein said ware is blow molded and formed with a neck finish that is molded and held for transfer in a partible neck mold that is closed on a plane disposed axially of the ware, comprising bringing the blow molded glassware in succession and supported only by its said neck finish confined in said closed neck mold of the machine in which said neck finish is formed to a take-out station of the machine that is remote from the blow mold thereof whereat the interior bore of the neck finish is accessible through its neck opening, applying a coolant to the interior surface of the neck finish of the blown article while at said take-out station by a nozzle means that applies an annular, radially outwardly directed band of the coolant directed radially substantially in a plane normal to the axis of the neck, said coolant being applied against the interior surface of the neck finish and in a vertically defined, axially extending surface area thereof that is within the axial extent of the neck mold and held thereby and the greatest amount of said coolant application is intermediate the neck mold seams which are along the axial plane for closing the said partible neck mold, and releasing the article from the neck mold for take-out and transfer from the machine by opening said partible neck mold.

References Cited in the file of this patent

UNITED STATES PATENTS

| | | |
|---|---|---|
| 825,423 | Schmitt | July 10, 1906 |
| 1,854,471 | Hoffman | Apr. 19, 1932 |
| 2,282,848 | Berthold | May 12, 1942 |
| 2,363,999 | Samuelson et al. | Nov. 28, 1944 |
| 2,368,472 | Jardine | Jan. 30, 1945 |
| 2,377,536 | Wisner | June 5, 1945 |
| 2,438,088 | Wyss | Mar. 16, 1948 |
| 2,466,182 | Peeps | Apr. 5, 1949 |
| 2,467,000 | Samuelson | Apr. 12, 1949 |
| 2,587,722 | Garratt et al. | Mar. 4, 1952 |
| 2,613,480 | Mongan | Oct. 14, 1952 |
| 2,627,702 | Lowe | Feb. 10, 1953 |
| 3,015,011 | Payne | Jan. 9, 1962 |